United States Patent [19]
Ernisse et al.

[11] 3,754,453
[45] Aug. 28, 1973

[54] BATTERY RECEIVING MECHANISM FOR CAMERA

[75] Inventors: Paul J. Ernisse; Joseph V. Poweska, both of Rochester, N.Y.

[73] Assignee: Eastman Kodak Company, Rochester, N.Y.

[22] Filed: July 29, 1971

[21] Appl. No.: 167,324

[52] U.S. Cl. ............................................. 95/11 R
[51] Int. Cl. ......................................... G03b 19/00
[58] Field of Search ............................. 95/11.5, 31; 352/242; 240/10.65

[56] References Cited
UNITED STATES PATENTS
1,127,856   2/1915   Boehm ........................... 240/10.65
1,223,686   4/1917   Frisch .................................... 95/31
2,187,356   1/1940   Malek ................................ 352/242
2,641,978   6/1953   Lawson .............................. 95/11.5
2,909,976   10/1959  Dearstyne .......................... 95/11.5

Primary Examiner—John M. Horan
Attorney—William H. J. Kline

[57] ABSTRACT

A battery compartment is located in the film compartment cover where it may be swung out for ready accessibility. Battery contacts on the main camera housing are movable by a cam integral with the cover hinge in response to opening and closing the cover. Relative movement between battery and contacts cleans the contacting surfaces.

7 Claims, 3 Drawing Figures

Patented Aug. 28, 1973

3,754,453

PAUL J. ERNISSE
JOSEPH V. POWESKA
INVENTORS

BY Leonard W. Treash, Jr.
W. W. J. Kline
ATTORNEYS

BATTERY RECEIVING MECHANISM FOR CAMERA

CROSS-REFERENCE TO RELATED APPLICATION

Reference is made to commonly assigned, copending U.S. Pat. Application Ser. No. 076,836 filed Sept. 30, 1970, in the name of Jeffrey R. Stoneham et al, entitled BATTERY HOLDER.

BACKGROUND OF THE INVENTION

This invention relates to battery receiving mechanisms and more specifically to a mechanism for cleaning the contacts of a battery compartment in a photographic camera.

The problems associated with corrosion of battery contacts in still cameras are well documented. It is common for camera manufacturers to suggest to camera users that both batteries and battery contacts be cleaned with abrasive material to improve electrical contact.

A more sophisticated approach to this problem is to protect the camera from corrosion by encasing batties in non-corrosive battery holders. Recently, a plastic battery holder has been developed which protects a set of three batteries. It is shaped to fit into a small space in a camera. A holder of this type is disclosed in U.S. Patent Application Ser. No. 76,836, filed Sept. 30, 1970 in the name of J. R. Stoneham, et al, entitled "Battery Holder." Another battery holder offering some protection to a camera is shown in U.S. Pat. No. 3,429,596, Peterson, issued Apr. 22, 1969. The use of battery holders is only a partial solution to the problem because corrosion of contacts will also occur from sources other than the batteries themselves.

In U.S. Pat. No. 3,587,423, Simon, issued June 28, 1971, a battery compartment is disclosed adjacent either a flash unit socket or a film compartment in which the battery and its contacts are rubbed together in response to insertion of a flash unit in the socket or magazine in the film compartment. This rubbing has the effect of cleaning the contacts and providing longer life for this portion of the apparatus. Unfortunately, it rarely has been convenient to place the batteries on a camera adjacent the flash socket, and the force of magazine insertion is not a convenient source of energy for operation of this type of mechanism, especially in a still camera. Neither of these systems have received commercial acceptance.

SUMMARY OF THE INVENTION

It is an object of this invention to clean the contacts for a battery in a camera during ordinary use of the camera.

It is another object of the invention to provide a camera battery compartment that is readily accessible for insertion and removal of a battery.

The first of these objects is accomplished by providing relative movement between a received battery and at least one of the contacts for the battery in response to opening or closing of the film compartment cover on a camera.

It is contemplated that such relative movement can be provided by moving either the battery or the contacts relative to the main housing of the camera. However, a maximum of cleaning action is obtained if both battery and contacts are moved simultaneously in substantially opposed directions.

In a preferred embodiment, the battery compartment is built into the film compartment cover of the camera where it is readily accessible for replacement. The contacts are mounted on the main camera housing and are movable by a cam surface connected to a cover hinge.

This structure has been found to be particularly suited for use with a battery holder of the type described in the aforesaid Stoneham, et al application in which the contacting surfaces have an oblique orientation relative to resiliently mounted contacts. This oblique orientation causes the contacts to move across the battery surface against their own resilient force as the battery and contacts are moved toward and away from each other.

DESCRIPTION OF THE PREFERRED EMBODIMENT

Figure 1:
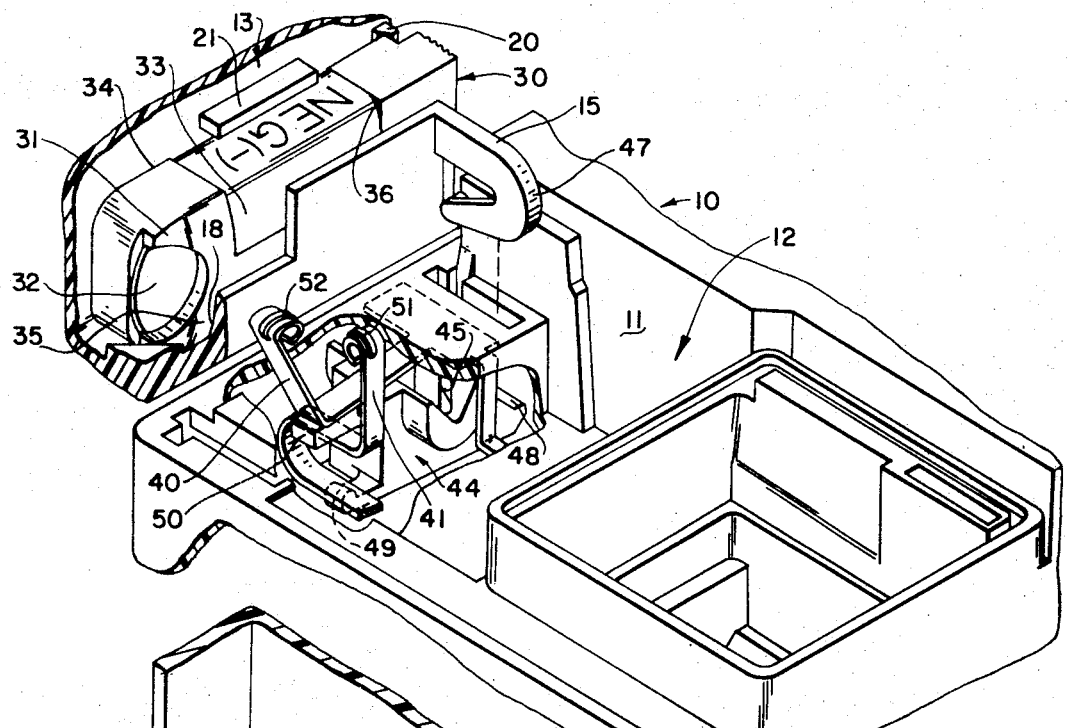
FIG. 1 is a perspective view of a portion of a camera embodying the present invention, with certain parts separated for purposes of illustration, and showing a film compartment cover in its open position with the battery in place and the battery contacts in their lowered position.

Referring to the drawing, this invention is shown in connection with a photographic camera 10. Since photographic cameras of the type hereinafter described are generally well known in the art, the present description will be directed in particular to elements forming a part of or cooperating more directly with the present invention. Elements not specifically shown or described herein being understood to be selectable from those known in the art.

Figure 3:
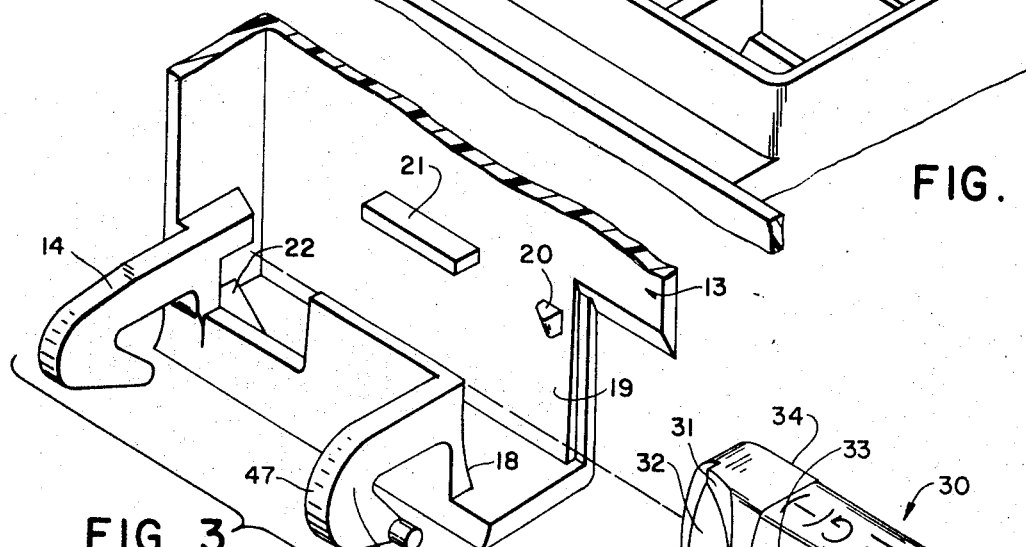
FIG. 3 is a perspective view of a portion of the cover with a battery holder removed and shown ready for insert.

Referring to FIG. 1, the camera 10 includes a main housing 11 which includes means defining a film compartment 12, for example, a compartment for a cartridge loading camera. The film compartment is closed by a cover 13 which is connected to the main housing 11 by hinge members 14 and 15 which can be molded integrally with the cover, as best shown in FIG. 3. The hinge members 14 and 15 mate with corresponding hinge members 16 and 17 on the main camera housing to secure the cover to the housing and allow it to be moved between open and closed positions.

Referring to FIG. 3, adjacent the hinge area of the cover are guide and retaining surfaces for receiving a source of electrical potential. These guide and retaining surfaces include a curved surface 18, a tapered wall 19, and three protrusions 20, 21 and 22. These surfaces are designed to receive a source of electrical potential such as a battery holder 30. Battery holder 30 is substantially described in the Stoneham, et al application mentioned above. It includes means for receiving three wafer-like cells which are carried in overlapping relationship inside a plastic holder. One end, 31, of the holder is open to permit access to one of the contacting surfaces 32 of one of the cells. The cells are then connected in series internally and to a second contact 33 forming a portion of the holder itself. The battery holder has opposite faces 34 and 35 which are generally curved except for a corner protrusion 36, shown in FIG. 1. Because the cells are carried in overlapping relationship within the battery holder, contacting surface 32 is generally obliquely oriented to surface 35 while the curvature on surface 35 generally provides for a similar oblique orientation of contact 33 with regard to the surface forming corner 36. As shown in FIG. 3, the battery holder 30 fits snugly between the curved surface 18 and the tapered wall 19 and protrusions 21 and 22 of the cover 13. If an attempt is made to insert a battery holder incorrectly, for example, with cell contact surface 32 facing away from hinge members 14 and 15, protrusion 20 will force corner member 36 to be engaged by tapered wall 19, preventing insertion. The battery holder is readily accessible for insert and removal when the cover is swung to its open position.

Figure 2:
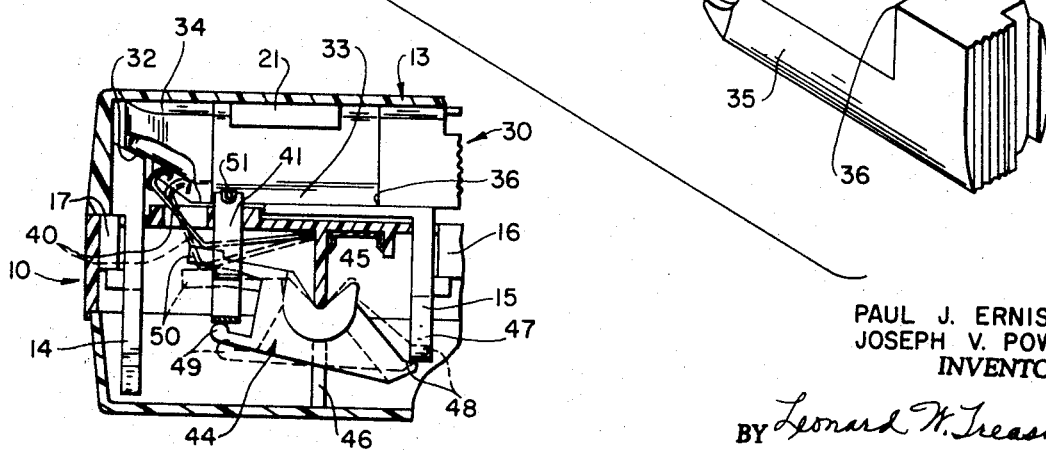
FIG. 2 is an end section of the structure shown in FIG. 1 with the movement of the contacts illustrated.

Referring to FIGS. 1 and 2, the camera 10 includes an electrical circuit, not completely shown, including a pair of electrical contacts 40 and 41 for connecting a source of electrical potential into the circuit. Contacts 40 and 41 are mounted on the main housing 11. Each contact is constructed of a resilient metal, secured to the housing at a point remote from its end and is bent between that point and the end. The contacts 40 and 41 project upward to contact potential source contact surfaces 32 and 33 when the cover 13 is moved to a closed position. Surfaces 32 and 33 are positioned oblique to the path of movement of the potential source during the closing movement and, on engagement, cam contacts 40 and 41 away from their normal positions against their own resilience. This camming action tends to make contacts 40 and 41 rub on surfaces 32 and 33 to partially clean the rubbing surfaces.

To accelerate this cleaning action, the contacts themselves are simultaneously urged in an upward direction by a rocker 44 which acts in response to the closing action of the cover 13. Rocker 44 is secured to a pivot 45 by a stud 46. Hinge member 15 of cover 13 includes a cam surface 47 which is engageable with one end 48 of rocker 44. Protrusions 49 and 50 on the end of rocker 44, opposite end 48, are engageable with contacts 40 and 41. As cover 13 is closed, cam surface 47 engages end 48 of rocker 44 pivoting rocker 44 around pivot 45, and protrusions 49 and 50 push contacts 40 and 41 in an upward direction, respectively.

Thus, as the cover for the film compartment is closed, the potential source 30 is moved toward the contacts 40 and 41 while the contacts are moved in an opposed direction toward the potential source. Assisted by the obliquely oriented contact surfaces and resilience in the contacts themselves, this motion causes the contacts to rub across the contact surfaces, cleaning all four surfaces.

This cleaning action is aided by roughening the ends of the contact surfaces. This can be done by irregularly punching holes in the surfaces to form raised margin holes 51 and 52.

Positioning the compartment for the source of electrical potential in the cover not only provides a portion of the relative movement giving the cleaning action mentioned above, but also provides accessibility to the potential source for supply and removal.

Although this invention is usable in either cine cameras or still cameras, it has particular use in a still camera because of the large amount of movement available in closing the cover of such a camera and the substantial open space available in the cover for a battery compartment.

The invention has been described in detail with particular reference to a preferred embodiment thereof, but it will be understood that variations and modifications can be effected within the spirit and scope of the invention.

We claim:

1. In a camera having a main housing, a film compartment cover movable relative to said housing between open and closed positions, an electrical circuit means for receiving a source of electrical potential, and a pair of contacts for connecting a received source of electrical potential into said circuit; the improvement comprising means for cleaning at least one of said contacts by moving the receiving means and said contact relative to each other in response to movement of the cover between its open and closed positions to provide rubbing engagement between said contact and a received source of potential.

2. The improvement according to claim 1 wherein said one contact is mounted in said main housing and the means for receiving the source of electrical potential is movable with the film compartment cover to provide said relative motion.

3. The improvement according to claim 1 wherein said one contact is movably mounted on said main housing, and said improvement further includes means for moving said one contact relative both to said main housing and to said receiving means in response to movement of said cover between its open and closed positions to provide said relative motion.

4. The improvement according to claim 1 wherein:
said means for receiving a source of electrical potential is rigidly connected to said film compartment cover for movement therewith in a first direction relative to said main housing;
said one contact is movably mounted on said main housing; and
said improvement further comprises means for moving said one contact in a second direction relative to said main housing substantially opposite said first direction in response to movement of said cover between its open and closed positions to provide said relative motion.

5. The improvement according to claim 1 wherein said one contact is resiliently mounted on said main housing and is movable across a portion of a surface of a received source of electrical potential by the source during said relative movement between said receiving means and said contact.

6. In a camera having (1) a main housing defining a compartment and (2) a door movable to open and close said compartment, the improvement comprising:
a hinge for said door;
means on said hinge defining a cam surface movable with said door;
means connected to said door and adjacent said hinge for receiving a source of electrical potential having contact surfaces;
a pair of electrical contacts located in said compartment adjacent said hinge; and
means movable by said cam surface in response to movement of said door for sliding said contacts across the contact surfaces of the received electrical potential source.

7. In a camera having a housing defining a film compartment, a cover movable between open and closed positions to provide access to said film compartment, an electrical circuit, means for receiving a source of electrical potential and a pair of contacts for connecting a received source of electrical potential to said circuit; the improvement comprising means for providing relative movment between at least one of said one contacts and a received source of electrical potential in response to movement of said cover between its open and closed positions so as to clean the electrical connection between said contact and said received source.

* * * * *

FO-1050
(5/69)

UNITED STATES PATENT OFFICE
CERTIFICATE OF CORRECTION

Patent No. 3,754,453        Dated August 28, 1973

Inventor(s) Paul J. Ernisse and Joseph V. Poweska

It is certified that error appears in the above-identified patent and that said Letters Patent are hereby corrected as shown below:

Claim 1, line 11, after "circuit", insert a comma --,--.

Signed and sealed this 1st day of January 1974.

(SEAL)
Attest:

EDWARD M. FLETCHER, JR.        RENE D. TEGTMEYER
Attesting Officer               Acting Commissioner of Patents